United States Patent
Chen et al.

(10) Patent No.: US 8,972,380 B2
(45) Date of Patent: Mar. 3, 2015

(54) SYSTEM AND METHOD FOR MONITORING EVENTS AGAINST CONTINUAL RANGE QUERIES

(75) Inventors: Shyh-Kwei Chen, Chappaqua, NY (US); Kun-Lung Wu, Yorktown Heights, NY (US); Philip Shi-lung Yu, Chappaqua, NY (US)

(73) Assignee: International Business Machines Corporaton, Armonk, NY (US)

( * ) Notice: Subject to any disclaimer, the term of this patent is extended or adjusted under 35 U.S.C. 154(b) by 3569 days.

(21) Appl. No.: 10/671,938

(22) Filed: Sep. 29, 2003

(65) Prior Publication Data
US 2005/0071321 A1    Mar. 31, 2005

(51) Int. Cl.
*G06F 7/00* (2006.01)
*G06F 17/30* (2006.01)

(52) U.S. Cl.
CPC ...... *G06F 17/30516* (2013.01); *G06F 17/3046* (2013.01)
USPC ......................................... 707/714; 707/769

(58) Field of Classification Search
USPC .............................. 707/102, 3, 714, 713, 769
See application file for complete search history.

(56) References Cited

U.S. PATENT DOCUMENTS

| | | | |
|---|---|---|---|
| 4,114,601 A | 9/1978 | Abels | |
| 4,774,657 A | 9/1988 | Anderson et al. | |
| 5,190,059 A | 3/1993 | Fabian et al. | |
| 5,315,709 A | 5/1994 | Alston et al. | |
| 5,513,110 A | 4/1996 | Fujita et al. | |
| 5,519,818 A | 5/1996 | Peterson | |
| 5,560,007 A | 9/1996 | Thai | |
| 5,560,014 A | 9/1996 | Imamura | |
| 5,664,172 A | 9/1997 | Antoshenkov | |
| 5,664,173 A | 9/1997 | Fast | |
| 5,745,894 A | 4/1998 | Burrows et al. | |
| 5,761,652 A | 6/1998 | Wu et al. | |
| 5,778,354 A | 7/1998 | Leslie et al. | |
| 5,812,996 A | 9/1998 | Rubin et al. | |
| 5,838,365 A | 11/1998 | Sawasaki et al. | |
| 5,873,079 A | 2/1999 | Davis et al. | |
| 5,884,304 A | 3/1999 | Davis et al. | |
| 5,884,307 A | 3/1999 | Depledge et al. | |
| 5,893,088 A | 4/1999 | Hendricks et al. | |
| 5,903,876 A | 5/1999 | Hagemier | |
| 5,915,251 A * | 6/1999 | Burrows et al. | 707/102 |
| 5,930,785 A | 7/1999 | Lohman et al. | |
| 5,931,824 A | 8/1999 | Stewart et al. | |
| 5,953,707 A | 9/1999 | Huang et al. | |
| 5,961,572 A | 10/1999 | Craport et al. | |
| 5,963,956 A | 10/1999 | Smartt | |
| 6,003,016 A | 12/1999 | Hagemier | |

(Continued)

OTHER PUBLICATIONS

Liu, Ling et al, "Continual Queries for Internet Scale Event-Driven Information Delivery," 1999, published by Oregon Graduate Institute of Science and Technology, pp. 1-30.*

(Continued)

*Primary Examiner* — Usmann Saeed
*Assistant Examiner* — Paul Kim
(74) *Attorney, Agent, or Firm* — Jeffrey Tang; McGinn IP Law Group, PLLC

(57) ABSTRACT

A method (and structure) for monitoring continual range queries against events includes decomposing each range query with one or more predefined virtual constructs, building a query index, and using the query index to match an event with the range queries.

16 Claims, 8 Drawing Sheets

(56) References Cited

U.S. PATENT DOCUMENTS

| | | | |
|---|---|---|---|
| 6,038,559 A | 3/2000 | Ashby et al. |
| 6,061,677 A | 5/2000 | Blinn et al. |
| 6,076,007 A | 6/2000 | England et al. |
| 6,078,899 A | 6/2000 | Francisco et al. |
| 6,088,648 A | 7/2000 | Shah et al. |
| 6,092,115 A | 7/2000 | Choudhury et al. |
| 6,105,019 A | 8/2000 | Burrows |
| 6,141,656 A | 10/2000 | Ozbutun et al. |
| 6,154,219 A | 11/2000 | Wiley et al. |
| 6,175,835 B1 | 1/2001 | Shadmon |
| 6,195,656 B1 | 2/2001 | Ozbutun et al. |
| 6,199,201 B1 | 3/2001 | Lamping et al. |
| 6,205,447 B1 | 3/2001 | Malloy |
| 6,289,334 B1 | 9/2001 | Reiner et al. |
| 6,298,170 B1 | 10/2001 | Morita et al. |
| 6,353,819 B1 | 3/2002 | Edwards et al. |
| 6,353,832 B1 | 3/2002 | Acharya et al. |
| 6,366,206 B1 | 4/2002 | Ishikawa et al. |
| 6,400,272 B1 | 6/2002 | Holtzman et al. |
| 6,424,262 B2 | 7/2002 | Garber et al. |
| 6,438,528 B1 | 8/2002 | Jensen et al. |
| 6,470,287 B1 | 10/2002 | Smartt |
| 6,487,549 B1 | 11/2002 | Amundsen |
| 6,510,423 B1 | 1/2003 | Ichikawa et al. |
| 6,529,903 B2 | 3/2003 | Smith et al. |
| 6,546,373 B1 | 4/2003 | Cerra |
| 6,571,250 B1 | 5/2003 | Hara |
| 6,591,270 B1 | 7/2003 | White |
| 6,600,418 B2 | 7/2003 | Francis et al. |
| 6,636,849 B1 | 10/2003 | Tang et al. |
| 6,640,214 B1 | 10/2003 | Nambudiri et al. |
| 6,669,089 B2 | 12/2003 | Cybulski et al. |
| 6,735,590 B1 | 5/2004 | Shoup et al. |
| 6,768,419 B2 | 7/2004 | Garber et al. |
| 6,809,645 B1 | 10/2004 | Mason |
| 6,861,954 B2 | 3/2005 | Levin |
| 6,900,731 B2 | 5/2005 | Kreiner et al. |
| 6,931,392 B1 * | 8/2005 | Skeen ................... 1/1 |
| 7,010,507 B1 | 3/2006 | Anderson et al. |
| 7,010,522 B1 | 3/2006 | Jagadish et al. |
| 7,019,650 B2 | 3/2006 | Volpi et al. |
| 7,142,118 B2 | 11/2006 | Hamilton et al. |
| 7,155,402 B1 | 12/2006 | Dvorak |
| 7,177,829 B1 | 2/2007 | Wilson et al. |
| 7,236,173 B2 | 6/2007 | Chithambaram et al. |
| 7,307,530 B2 | 12/2007 | Fabian et al. |
| 7,557,710 B2 | 7/2009 | Sanchez et al. |
| 2002/0007360 A1 | 1/2002 | Hawkinson |
| 2002/0067263 A1 | 6/2002 | Tafoya et al. |
| 2002/0143320 A1 | 10/2002 | Levin |
| 2003/0066537 A1 | 4/2003 | Fabian et al. |
| 2003/0105394 A1 | 6/2003 | Fabian et al. |
| 2003/0187867 A1 * | 10/2003 | Smartt .................. 707/102 |
| 2004/0084525 A1 | 5/2004 | Kreiner et al. |
| 2004/0129279 A1 | 7/2004 | Fabian et al. |
| 2004/0201479 A1 | 10/2004 | Garber et al. |
| 2004/0250819 A1 | 12/2004 | Blair et al. |
| 2007/0093709 A1 | 4/2007 | Abernathie |
| 2007/0290030 A1 | 12/2007 | Fox et al. |

OTHER PUBLICATIONS

Japan sensor array can image full hemisphere without PC Help, Apr. 15, 2002, AsiaPulseNews.

* cited by examiner

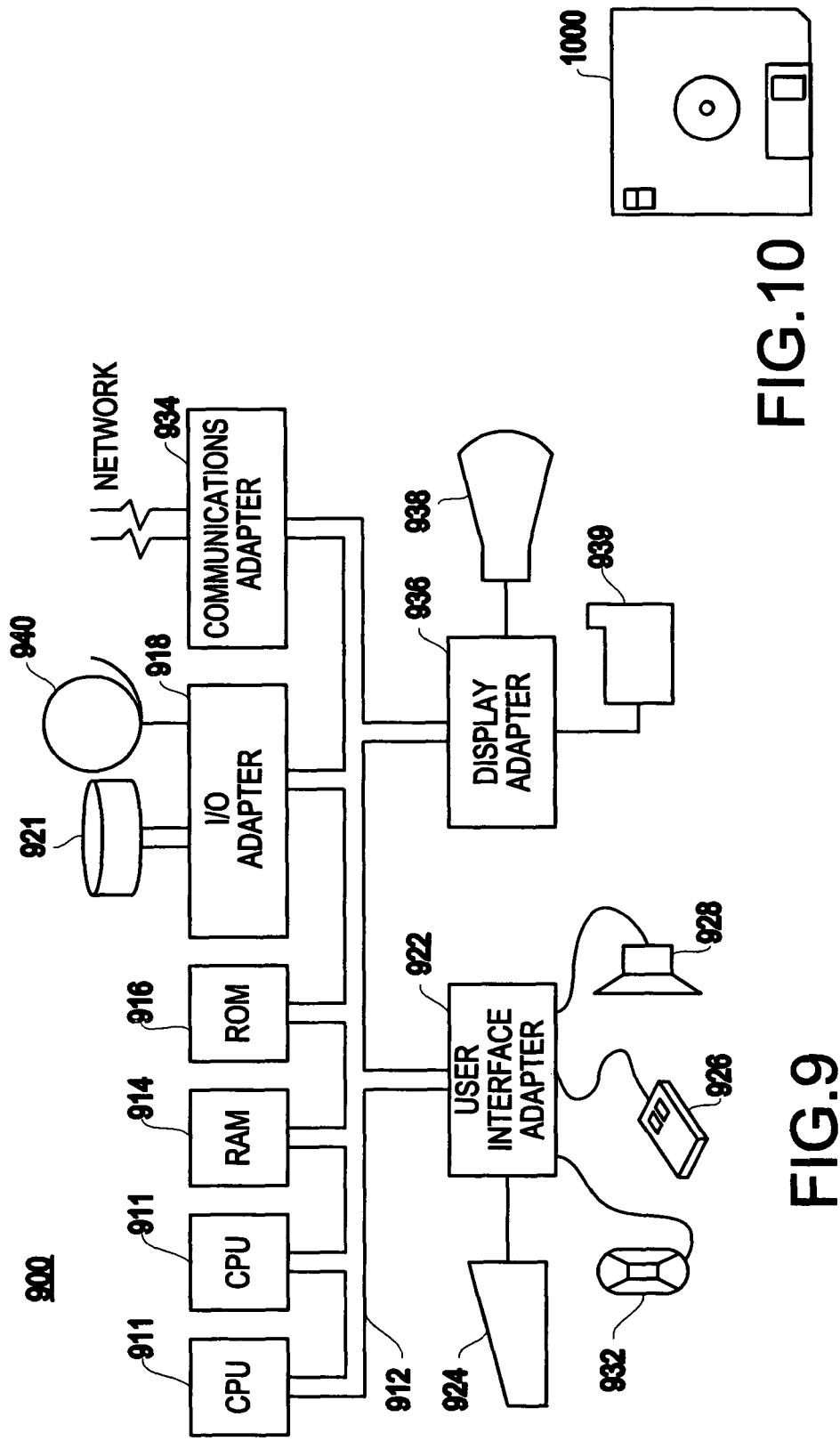

SYSTEM AND METHOD FOR MONITORING EVENTS AGAINST CONTINUAL RANGE QUERIES

CROSS-REFERENCE TO RELATED APPLICATIONS

The present Application is related to the following co-pending application:

U.S. patent application Ser. No. 10/671,932, filed Sep. 29, 2003, to Chen et al., entitled "Method and Structure for Monitoring Moving Objects"; and U.S. patent application Ser. No. 10/673,651, filed Sep. 29, 2003, to Chen et al, entitled "System and Method for Indexing Queries, Rules and Subscriptions", both assigned to the present assignee, and both incorporated herein by reference.

BACKGROUND OF THE INVENTION

1. Field of the Invention

The present invention generally relates to activity/event monitoring in various application areas such as business activity monitoring for corporate management, sensor activities monitoring for continual queries, road traffic condition monitoring for traffic control, event matching for pub/sub applications, information monitoring for selective information dissemination, and health activity monitoring for disease outbreaks or bio-attacks. More specifically, it discloses a predicate/query indexing method for monitoring activities/events against a plurality of continual range predicates/queries.

2. Description of the Related Art

Fast matching of events against a large number of predicates/queries is important for many applications, such as business activity monitoring, content-based pub/sub (publication/subscription), continual queries, health activity monitoring, and selective information dissemination services. Users simply specify their interests in the form of a conjunction of predicates. The system then automatically monitors these user interests against a continual stream of events, conditions, or activities.

Generally, an efficient predicate index is needed. Prior work for fast event monitoring has mostly focused on building predicate indexes with equality-only clauses, as in, for example:

"Matching events in a content-based subscription system," by M. K. Aguilera et al., in *Proc. of Symposium on Principles of Distributed Computing*, 1999; and "Filtering algorithms and implementation for very fast publish/subscribe systems," by F. Fabret et al., in *Proc. of ACM SIGMOD*, 2001.

However, many queries/predicates contain non-equality range clauses. For example, stock price, salary, and object location tend to involve non-equality range predicates.

It is difficult to construct an effective index for multidimensional range predicates. It is even more challenging if these predicates are overlapping, as they usually are because people tend to share similar interests. For instance, people tend to be interested in the current price ranges of individual stocks. Hence, the range predicates of their interests are likely to be overlapping.

Although multidimensional range predicates can be treated as spatial objects, a typical spatial index, such as an R-tree, is generally not effective for monitoring events. This is because an R-tree method is generally a disk-based indexing method and an R-tree quickly degenerates if spatial objects are highly overlapping (V. Gaede et al., "Multidimensional access methods," *ACM Computing Surveys*, 30(2):170-231, 1998.; A. Guttman, "R-trees: A dynamic index structure for spatial searching," *Proceedings of ACM SIGMOD*, 1984.)

Hence, a need is recognized for a new and effective system and method for efficient monitoring of events against range queries, some of them may overlap with one another.

SUMMARY OF THE INVENTION

In view of the foregoing problems, drawbacks, and disadvantages of the conventional systems, it is an exemplary feature of the present invention to provide a structure (and method) for building an efficient query index for monitoring continual range queries against events.

It is, therefore, an exemplary purpose of the present invention to provide a structure and method for application areas such as business activity monitoring for corporate management, sensor activities monitoring for continual queries, road traffic condition monitoring for traffic control, event matching for publication/subscription applications, information monitoring for selective information dissemination, and health activity monitoring for disease outbreaks or bio-attacks, using an efficient query index for monitoring continual range queries against events.

Hence, in a first aspect of the present invention, described herein is a method (and structure) for monitoring continual range queries against events includes decomposing each range query into one or more predefined virtual constructs, building a query index, and using the query index to match an event with the range queries.

In a second aspect of the present invention, described herein is a method of providing a service of monitoring events or conditions, including at least one of: providing a service that monitors events against interests of a customer, the service monitoring the events by decomposing continual range queries related to the customer interests into one or predefined virtual constructs, building a query index, and using the query index to match an event with said range queries; maintaining one or more customer interests expressed as continual range queries for a service that monitors events in the manner described; and notifying a subset of the customers whose interests match an event.

In a third aspect of the present invention, described herein is a system for monitoring continual range queries against events, including a decomposing module that decomposes each range query with one or more predefined virtual constructs, a query index construction module, and an event matching module that uses the query index to match an event with the range queries.

In a fourth aspect of the present invention, described herein is an apparatus for monitoring continual range queries against events, wherein the apparatus is one of: a query monitor that includes a decomposing module that decomposes each range query into one or more predefined virtual constructs, a query index construction module, and an event matching module that uses the query index to match an event with the range queries; a sensor to detect occurrence of events and provides the occurrence of events into the query monitor; and a client receiver to permit a client to be notified of occurrence of an event of interest to the client.

According to a fifth aspect of the present invention, described herein is signal-bearing medium tangibly embodying a program of machine-readable instructions executable by a digital processing apparatus to perform the method for monitoring continual range queries against events, as described above.

BRIEF DESCRIPTION OF THE DRAWINGS

The foregoing and other objects, aspects and advantages will be better understood from the following detailed description of a preferred embodiment of the invention with reference to the drawings, in which:

FIG. 9 illustrates an exemplary hardware/information handling system 900 for incorporating the present invention therein; and FIG. 10 illustrates a signal bearing medium 1000 (e.g., storage medium) for storing steps of a program of a method according to the present invention.

DETAILED DESCRIPTION OF A PREFERRED EMBODIMENT OF THE INVENTION

Figure 1:
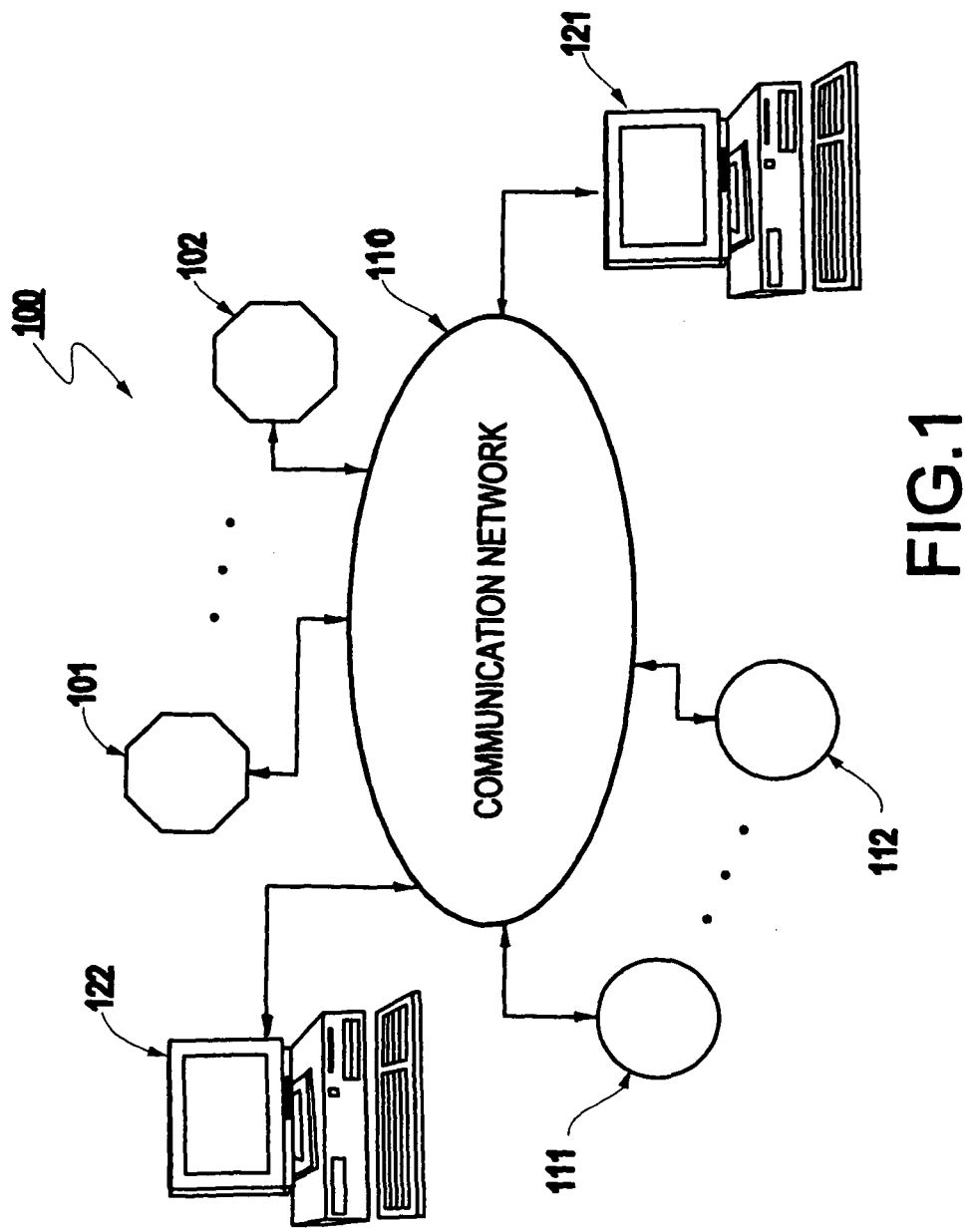
FIG. 1 shows an exemplary system block diagram 100 of an environment where a plurality of continual range queries are monitored against events.

Referring now to the drawings, and more particularly to FIG. 1, an exemplary embodiment will now be described. The present invention teaches a novel indexing scheme for range queries in an event space, exemplarily, a two-dimensional space. An example of a basic construct in the present invention is the "VCR", which stands for "Virtual Construct Rectangle". This basic construct can be extended to spaces having more than two dimensions. For the single dimensional space, a virtual construct interval (VCI) scheme can be used, as further described in the second of the above-identified copending patent applications.

FIG. 1 shows an exemplary system block diagram 100 of an environment where a plurality of continual range queries are monitored against events. One or more sensors 101, 102 are deployed to monitor conditions, events, or activities. These events or activities are sent to one or more query monitors 121, 122, via a communication network 110. Range queries are submitted from one or more clients 111, 112 to the query monitors 121, 122.

The sensors, clients and query monitors are connected via a communication network 110, e.g., the Internet. The query monitors 121, 122 typically are computer servers. The query indexing method disclosed in the present invention is employed by the query monitors 121, 122 to efficiently identify all the range queries that match an incoming event. Those skilled in the art will appreciate that the sensors, the clients, or the query monitors may employ wireless technologies for communication.

Figure 2:
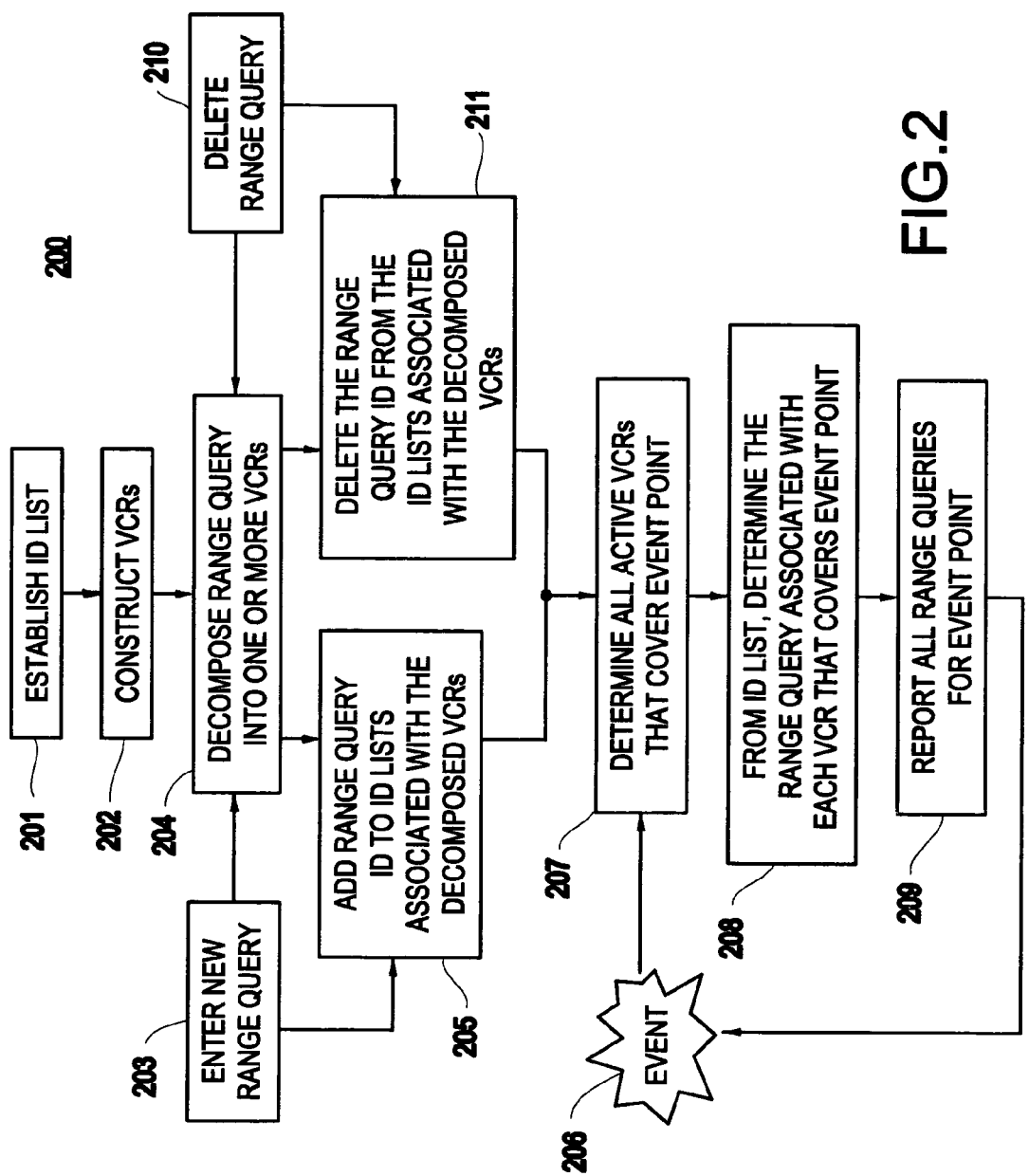
FIG. 2 shows a flowchart 200 that summarizes an exemplary embodiment of the present invention.

FIG. 2 shows a flowchart 200 that summarizes an exemplary embodiment using the novel VCR indexing scheme for range queries in two-dimensional space. As mentioned previously, VCR stands for "Virtual Construct Rectangle". The concept discussed herein can readily be extended to more than two dimensional spaces.

As shown in FIG. 2, in steps 201 and 202, an empty ID list is established and a set of virtual construct rectangles are predefined (e.g., a set of rectangles having sides based on powers of 2). In steps 203 and 204, upon entry, each range query is decomposed into one or more of the predefined VCRs. In step 205, the range query ID is then inserted into the ID lists associated with these decomposed VCRs.

As shown in steps 206-209, event matching is conceptually simple. For each event point, the search results are stored in the ID lists associated with the activated VCRs that cover that point. However, it is computationally nontrivial to identify the covering VCRs, and the present invention provides a very efficient method to accomplish this task.

A covering VCR set for each point is defined. These covering VCR sets share two common properties: constant size and identical gap pattern. Based on these properties, a procedure for efficient event monitoring with a constant time complexity is disclosed.

For exposition, the two-dimensional case will be discussed. A set of virtual construct rectangles is defined so that each point in the monitoring region, which is a rectangle for the two-dimensional case, will be covered. As will be demonstrated shortly, the set of VCRs for these points in the monitoring region will be identified as based on location of the VCR's bottom-left corner and the VCR size, but the VCRs in the monitoring region may have different sizes and shapes. Each VCR has a unique ID and this ID can be computed with a simple formula, given the location of its bottom-left corner and its width and height and the width of the overall region being monitored.

Before a range query, which is represented as a rectangle in the two-dimensional case, is inserted into the ID list, it is decomposed into one or more VCRs (e.g., step 204). Then, in step 205, the query ID is inserted into the ID lists associated with the decomposed VCRs. There are many ways that range query decomposition could be done.

One simple way discussed shortly is to cut a strip rectangle from the bottom of the query rectangle and progressively move upwards. The height of the strip rectangle is the maximum VCR height that will fit into the range query. For each strip rectangle, the largest VCR having the same height as the strip rectangle is used to cut the strip rectangle, and each strip rectangle is decomposed with VCRs of the same height.

As shown in step 207 of FIG. 2, to search all the queries that are matched by an incoming event (e.g., step 206), all the covering VCRs for that event point are found, and then, from these covering VCRs, in step 208, all the queries that have used at least one of these covering VCRs in their decomposition is found and reported in step 209. The covering VCR set for a point is defined as the set containing all the VCRs that can possibly cover this point.

The covering VCR sets for all the points share two common properties, enabling an efficient way to enumerate all the IDs of VCRs in a covering VCR set. A distance table which stores the ID differences between a VCR in the covering VCR set and a pivot point is pre-computed. As a result, all the VCRs in a covering VCR set can be enumerated by adding the differences to the ID of the pivot point.

Finally, as shown in step 210, to delete a range query, it is first decomposed into one or more VCRs, similar to query insertion. Then, in step 211, the query ID is removed from the ID lists associated with the decomposed VCRs.

Figure 3:
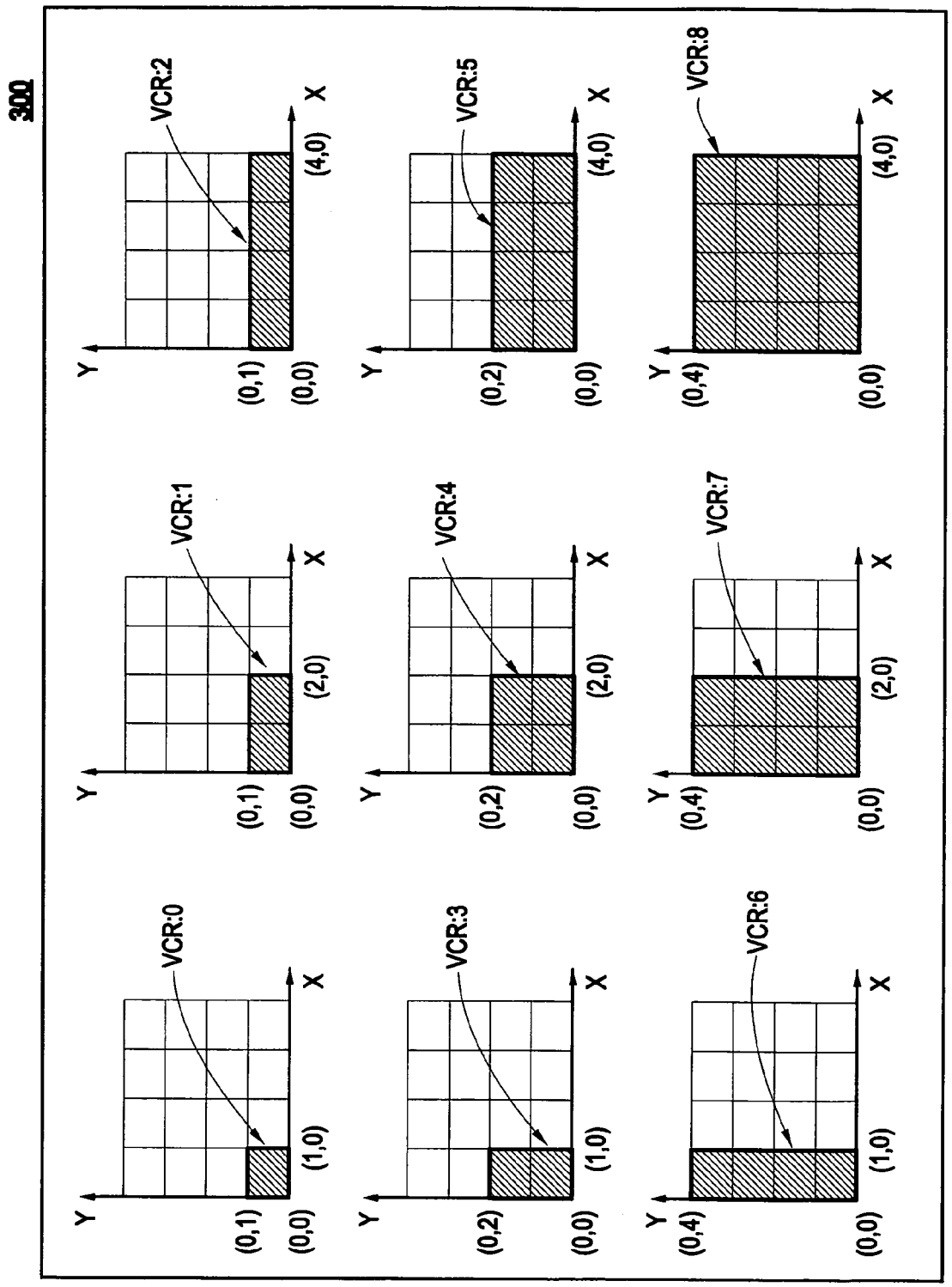
FIG. 3 shows an example of a set 300 of nine Virtual Construct Rectangles (VCRs) whose bottom-left corners are positioned at point (0, 0)

The Virtual Construct Rectangles (VCRs) used in this exemplary preferred embodiment is shown in FIG. 3 for two-dimensional space. Extension to a higher dimension, as well as to a single dimension is straightforward.

The query indexing method exemplarily disclosed herein predefines B virtual construct rectangles for each point (x, y). FIG. 3 shows an example of a set 300 of nine VCRs (e.g., VCRs identified as VCR:0 through VCR:8). In this scheme, the number of VCRs possible (e.g., B=9) is based on the size of the largest VCR (e.g., the 4×4 size VCR labeled VCR:8, in FIG. 3).

It can be seen that, in FIG. 3, the bottom-left corner of each VCR is positioned at point (0, 0). It is also seen that each VCR has its own unique shape and size, ranging from 1×1 through 4×4. The differences in VCR size is interrelated in powers of 2. It should be apparent that using powers of 2 is inherently supported by the binary representation used in a computer word, and has the advantage that the VCR concept allows a construction of VCRs that can cover any rectangular range query, as will be shortly apparent. Each VCR also has its own identification (ID) as well (e.g., ranging from 0 to 8 in FIG. 3), to be discussed next.

In accordance with the exemplary identification scheme, the VCR IDs shown in FIG. 3 are quite simple. The identification scheme will also allow a unique identification to be assigned to a VCR as it is activated to be assigned any arbitrary location. The equation for the exemplary identification scheme is based on the location of the lower left corner of the VCR in the monitored region, the width and height dimensions of the VCR, the size of the entire region being monitored (i.e., the overall area being scanned for check for event points), and the number B of VCRs in the VCR set (e.g., B=9 in FIG. 3, since there are 9 possible VCRs in the 4×4 set). However, it should also be apparent that different numbers of VCRs with different shapes and sizes can be defined for a point without departing from the intent of the present invention.

Figure 4:
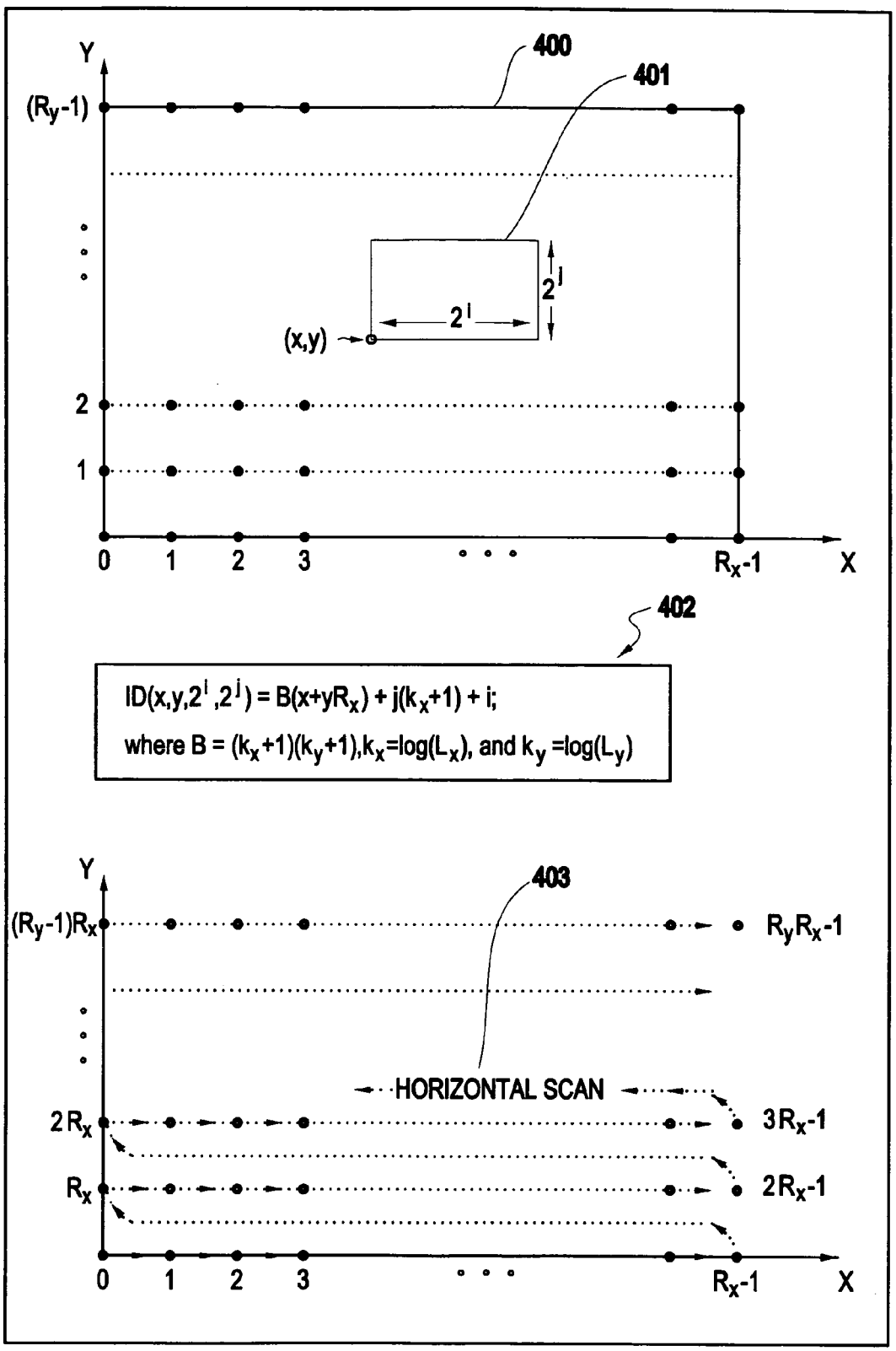
FIG. 4 shows an example of assigning a unique identification (ID) to any VCR in an area 400 being monitored.

FIG. 4 shows an example of assigning a unique ID to any VCR 401 in an area 400 being monitored (e.g., VCR(x,y,$2^i$, $2^j$), where (x,y) represents the location of the VCR bottom-left corner). The monitoring area 400 is defined by a rectangular region, where $0 \leq x \leq R_x-1$, and $0 \leq y \leq R_y-1$. As shown by the formula 402 in FIG. 4, and since there are B predefined VCRs, a unique ID can then assigned to any VCR (x,y,$2^i$,$2^j$), where (x, y) represents the bottom-left corner position of the VCR, $2^i$ is the VCR width, and $2^j$ is the VCR height: ID(x,y, $2^i,2^j$)=B(x+y$R_x$)+j($k_x$+1)+i, where B=($k_x$+1)($k_y$+1), $k_x$=log ($L_x$), and $k_y$=log($L_y$). In the exemplary scheme, the logarithms would conveniently be base 2.

Therefore, returning to FIG. 3, this formula can be checked out for various of the VCRs shown in that figure, as follows:

For "VCR:0", since $L_x$ and $L_y$ are 4, then $k_x$=2. Also, (x,y)=(0,0),i=0,j=0, B=9. Therefore, VCR (0,0,$2^0$,$2^0$)=9 (0+0*Rx)+0(2+1)+0=0. Note that the width of the monitor area Rx is irrelevant when the VCR is located at (0,0), as in FIG. 3.

For "VCR: 4", $k_x$=2,(x,y)=(0,0),i=1,j=1,B=9, so that VCR (0,0,$2^1$,$2^1$)=9(0+0*Rx)+1(2+1)+1=4.

For "VCR: 8", $k_x$=2, (x,y)=(0,0),i=2, j=2,B=9, so that VCR (0,0,$2^2$,$2^2$)=9(0+0*Rx)+2(2+1)+2=8.

The formula above is based on the fact that there are (x+y$R_x$) points prior to (x, y) in a horizontal scan 403 of the integer points in the monitoring region 400, as shown in the lower portion of FIG. 4. That is, horizontal scanning of the monitored region 400 would occur by holding y constant and varying x through the monitored region (e.g., x=0→Rx−1).

Moreover, for all the B VCRs sharing the same bottom-left corners, their IDs are assigned according to FIG. 3, where $L_x$ and $L_y$ are the maximum width and height, respectively, for a VCR predefined set.

In the exemplary embodiment, $L_x$ and $L_y$ are assumed to be numbers that are a power of 2. Namely, $k_x$=log($L_x$), and $k_y$=log($L_y$), or more accurately, $k_x$=$\log_2(L_x)$, and $k_y$=$\log_2(L_y)$, where $k_x$ and $k_y$ are integers. However, it should be apparent that the IDs can be assigned differently. As one alternative method, the scan could be performed vertically (e.g., holding x constant and varying y from 0 to Ry-1.

Figure 5:
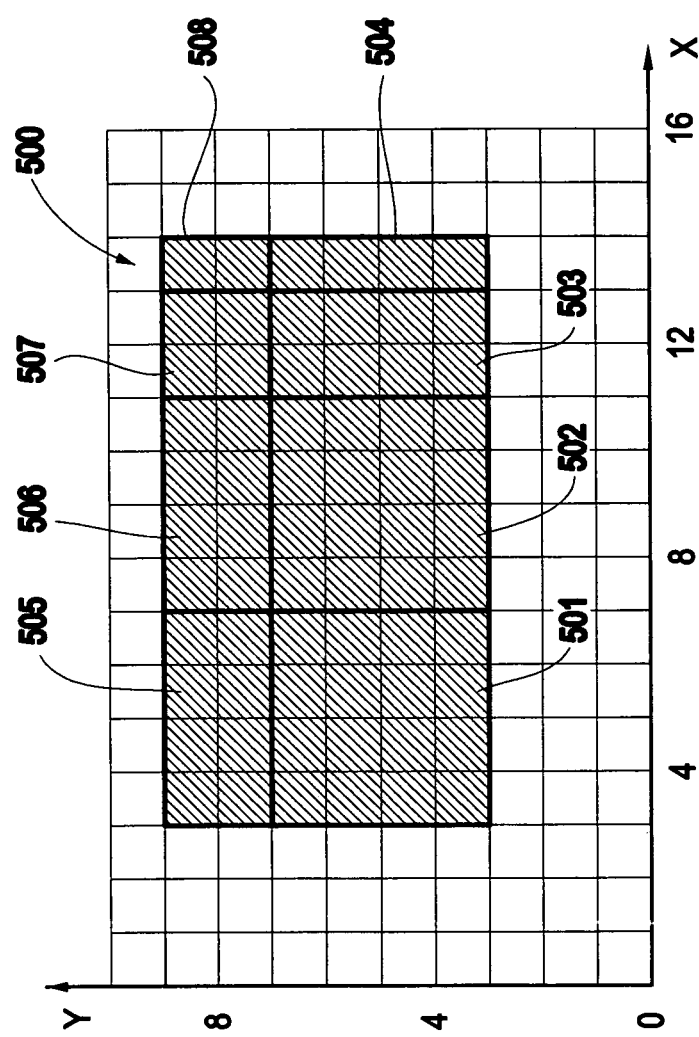
FIG. 5 shows an example of decomposing a range query 500.

With predefined VCRs, the range queries are decomposed with one or more VCRs. FIG. 5 shows an example of decomposing an exemplary range query (3, 3, 11, 6), meaning a range 500 having bottom-left corner at (3, 3), width 11 and height 6. In this exemplary method, first two 4×4 VCRs 501, 502 are activated. Activation occurs via the decomposition process. Then, a 2×4 VCR 503, a 1×4 VCR 504, two 4×2 VCRs 505, 506, one 2×2 VCR 507 and one 1×2 VCR 508 are activated. Hence, a total of eight VCRs are used to decompose this exemplary range query 500.

Incidentally, using the formula shown in FIG. 4 for VCR identification, the identification of various of these eight VCRs (using the VCRs from FIG. 3, where $k_x$=2) would be (since B=9, Rx=17):

$VCR_{501}$, $ID(3,3,2^2,2^2)=9(3+3*17)+2(2+1)+2=494$;

$VCR_{502}$, $ID(7,3,2^2,2^2)=9(7+3*17)+2(2+1)+2=530$;

$VCR_{504}$, $ID(13,3,2^0,2^2)=9(13+3*17)+2(2+1)+0=582$;

$VCR_{505}$, $ID(3,7,2^2,2^1)=9(3+7*17)+1(2+1)+2=1103$; and $VCR_{508}$, $ID(13,7,2^0,2^1)=9(13+7*17)+1(2+1)+0=1713$.

Figure 6:
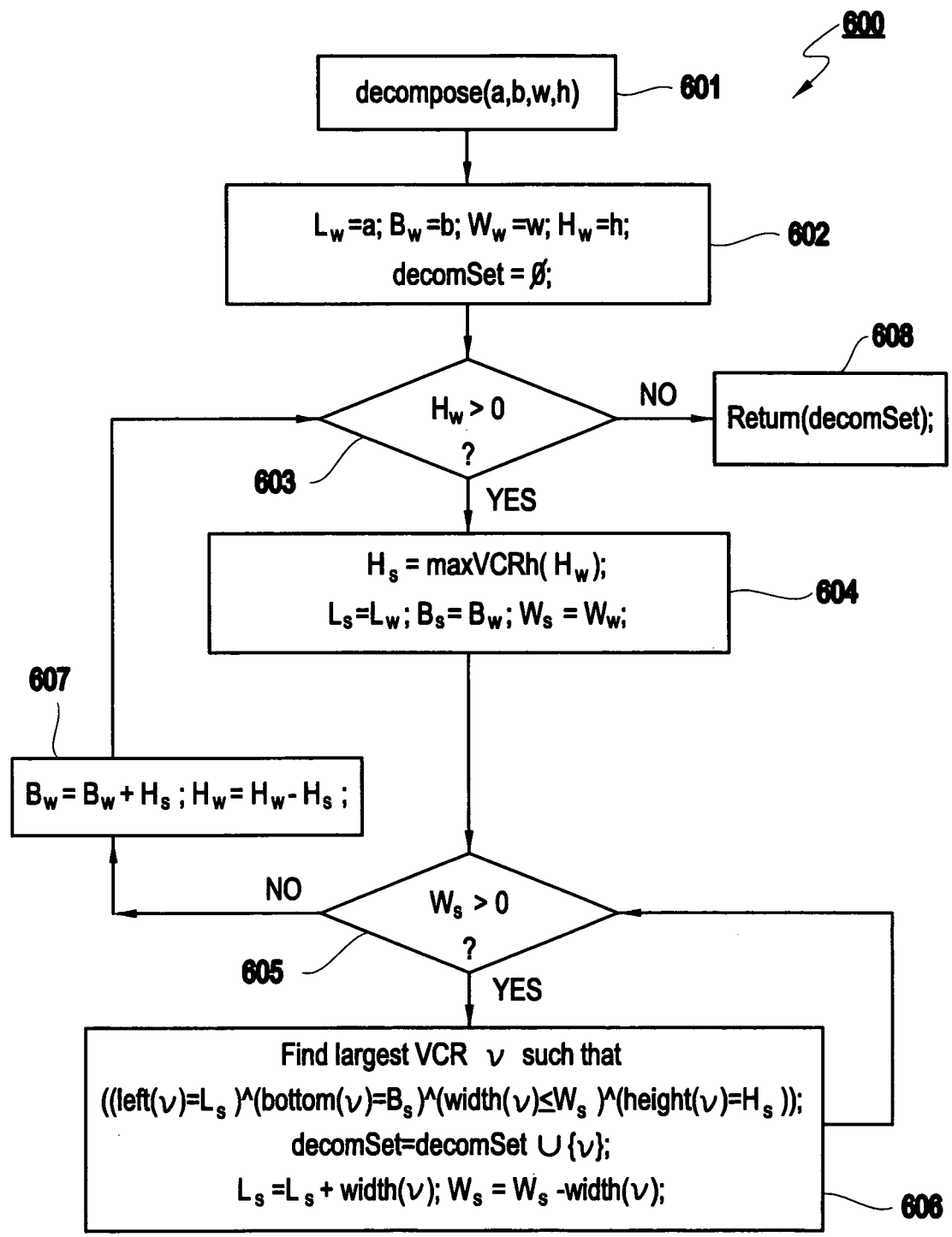
FIG. 6 shows a flow chart 600 of an exemplary decomposition routine.

FIG. 6 shows an exemplary flow chart 600 of an exemplary decomposition routine. As shown in steps 601 and 602, to decompose a range query (a, b, w, h), the routine first initializes the working rectangle to be the range query and the decomSet to be empty. Step 603 causes the routine to then loop until the height of the working rectangle is less than or equal to 0.

When that happens, in step 608, the decomSet is returned, where decomSet stores all the IDs of VCRs that are used to decompose (a, b, w, h). In step 604, if the height of the working rectangle is greater than 0, a strip rectangle with a height of maxVCRh($H_w$) is cut from the working rectangle. That is, the height of the strip rectangle is the maximum VCR height that is smaller than or equal to the height of the working rectangle. In step 606, for this strip rectangle, the largest VCR that can decompose the strip rectangle from the left and moving towards the right is found and added to the decomSet.

After each strip rectangle is decomposed, as detected in step 605, another strip rectangle is cut from the working rectangle, in step 607, and similarly decomposed.

At the end, in step 608, the decomposed VCRs are contained in decomSet. It should be apparent that there are other ways to decompose a range query. For example, some of the decomposed VCRs may overlap one another. It should also be apparent that it would be possible to expand the set of VCRs to include a larger power of 2, should an entered range query be larger than initially expected.

After decomposition, the query ID is inserted into the ID lists associated with the decomposed VCR (e.g., step 205 in FIG. 2). As a result, the ID list associated with a VCR contains all the IDs of range queries that have used this VCR in its decomposition. Events or conditions matched by this said VCR are also matched by these range queries. Thus, monitoring range queries against events becomes the task of finding all the covering VCRs for any point, since events are represented by points in the monitoring region.

Figure 7:
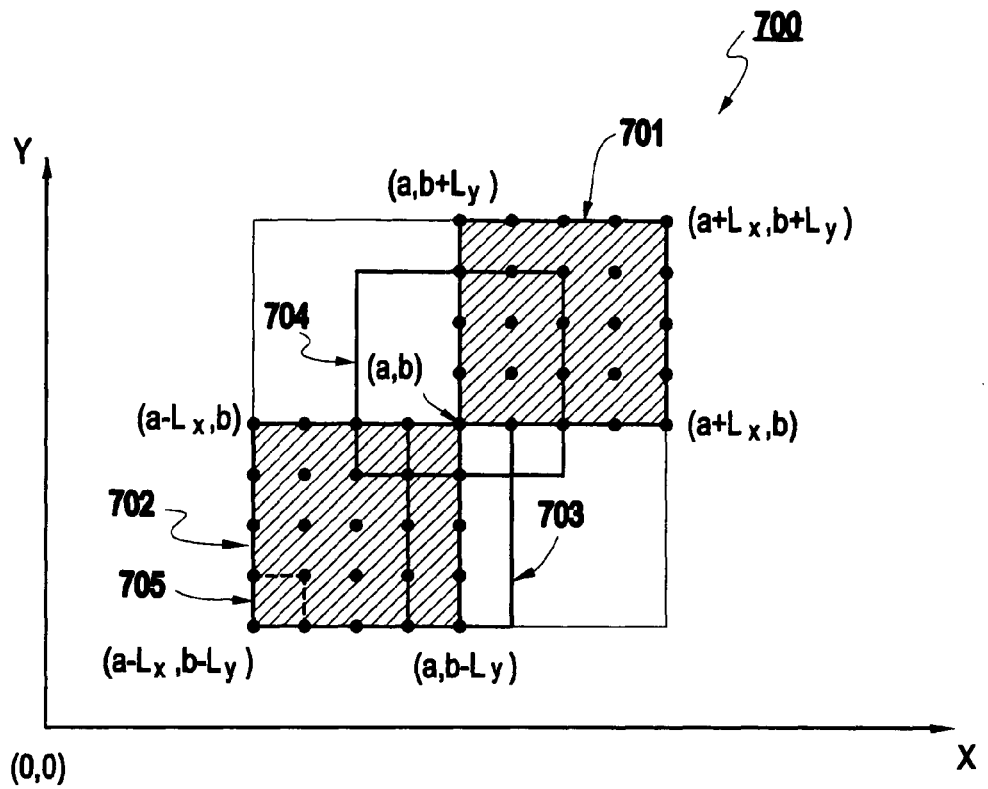
FIG. 7 shows an example 700 of a covering VCR set.

According, assuming that Cov(a, b) represents the covering VCR set for point (a, b). That is, Cov(a, b) contains all the VCRs that actually cover point (a, b). FIG. 7 shows an example of Cov(a, b).

Remembering that the VCR set contains a maximum VCR having dimensions $L_x$, $L_y$, then Cov(a, b) will include the set of any activated VCRs whose bottom-left corners are in the shaded region southwest of (a, b) and whose upper-right corners are in the shaded region northeast of (a, b), as shown in FIG. 7. For example, 701, 702, 703, and 704 are such VCRs in the covering set.

The covering VCR sets for all points in the monitoring region share two common properties: constant size and identical gap pattern. For ease of exposition, consider the region that is inside the monitoring region separated with a boundary strip region, namely, the region $L_x \leq a \leq R_x - L_x - 1$, and $L_y \leq b \leq R_y - L_y - 1$. For the boundary strip region, a similar method can be applied. It is noted that a and b are considered variables in this context.

The constant size property says that |Cov(a, b)|=|Cov(c, d)|, for any two different points (a, b) and (c, d). Namely, the sizes of the covering VCR set for individual points are all the same. This can be visually appreciated from FIG. 7 by moving around all the points together. The sizes of the shaded regions remain the same.

The identical gap pattern property says that, if the IDs inside a covering VCR set are sorted, the ID differences between any two VCRs are constant among all the covering VCR sets of different points. Let $V_{i,(a,b)}$ denote the ID of a covering VCR for (a, b) and $V_{i+1,(a,b)} > V_{i,(a,b)}$. Then, $V_{i+1,(a,b)} - V_{i,(a,b)} = V_{i+1,(c,d)} - V_{i,(c,d)}$, for $1 \leq i \leq |$ Cov(a,b)| and any two points (a, b) and (c, d). This property can also be appreciated from FIG. 7 by first grouping all the drawings together as a unit and then moving it around. When the center is moved from (a, b) to (c, d), the relative positions of all the covering VCRs stay the same.

With these two properties, a difference table DT can be pre-computed, which table stores the ID differences between all the covering VCRs and a pivot VCR. For a point (a, b), the pivot VCR is defined as $(a-L_x, b-L_y, 1, 1)$, and shown in FIG. 7 as the VCR having label "705". This pivot VCR is not a member of the covering VCR set for (a, b), however. Together with the pivot VCR, this DT can be used to efficiently compute all the IDs of VCRs in the covering VCR set of any point.

Figure 8:
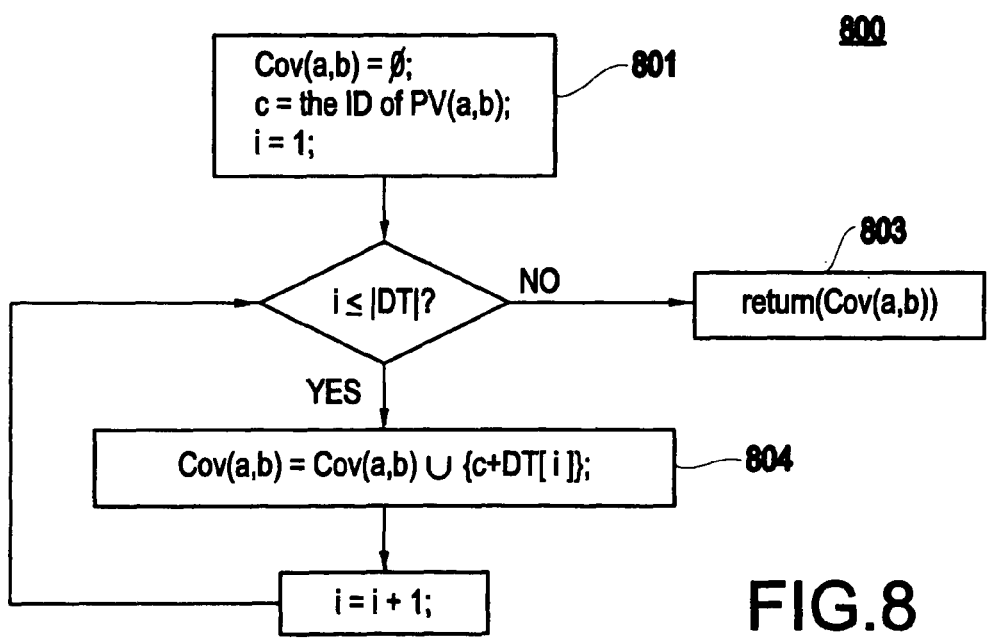
FIG. 8 shows an exemplary flow chart 800 of an exemplary routine for finding all the IDs of VCRs in the covering VCR set of a point.

FIG. 8 shows an exemplary flow chart 800 of an exemplary routine for finding all the IDs of VCRs in the covering VCR set of a point (a, b). In step 801, the routine first initializes Cov(a, b) to be empty, computes the ID c of the pivot VCR, and sets i=1.

Then, in step 804, for each value in difference table DT, each value is added with the ID of the pivot VCR and included in Cov(a, b). At the end, in step 803, the covering VCR set stored in Cov(a, b) is returned.

With the IDs of all the covering VCRs for a point, the range queries can be found directly from the ID lists associated with all the covering VCRs.

Those skilled in the art will appreciate that the VCR indexing method can be extended to K>2 dimensions. Assuming that the K dimensions have $R_1, R_2, \ldots, R_K$ values (all starting from 0), and also assuming that $L_1, L_2, \ldots, L_K$ are the maximum sizes of a K-dimensional virtual construct regions (VCR), B VCRs can potentially be defined for each point. Each VCR is assigned with a unique ID.

To insert a range query, it is first decomposed into a set of VCRs and then the query ID is inserted into the ID lists associated with the decomposed VCRs. To find all the range queries matching an event, all the covering VCRs are first found and then the query IDs associated with the covering VCRs are found.

To delete a range query, it is first decomposed into one or more VCRs, similar to query insertion. Then, the query ID is removed from the ID lists associated with the decomposed VCRs.

Those skilled in the art will also appreciate that, in a single dimensional space, the virtual construct rectangles become virtual construct intervals (VCI), as further described in the second above-listed copending patent application.

Those skilled in the art will appreciate that various kinds of services can be provided based on the system and method disclosed in the current invention. For example, a service can be offered to monitor stock prices. Customers can express their interests in the form of queries, such as "send me alerts whenever IBM stock price is over 100". The stock prices represent the events and are continually monitored against one or more queries.

Another exemplary service can be provided to monitor public health conditions. In this case, the events are the various statistics from hospitals, doctor offices, school absentee data, and others. These data are continuously collected and monitored against one or more continual range queries. Alerts can be sent to proper agencies when one or more of such range queries match an event.

Yet another exemplary service can be provided to offer subscription services to one or more publishers. The publishers publish contents and are filtered or monitored against one or more subscriptions. The subscribers express their individual interests in the form of a continual range queries. The service providers will monitor and match the published contents against one or more subscription queries. Matched publications are then forwarded to the subscribers.

However, it should be apparent that these examples above are only exemplary possible applications of the present invention and are not intended as limiting the present invention in any way. The present invention provides a computerized technique of monitoring events against queries and, returning back to the block diagram of FIG. 1, will be of interest to any of the levels of users or implementation shown in FIG. 1.

Thus, a consumer of the present invention could be considered as the end user represented as the one or more clients 111, 112 requesting the end result of the present invention, or as a service provider, represented by query monitors 121, 122, that receives a query from clients 111, 112 and provides the end result back to the clients 111, 112. Under certain conditions, it is possible that the owner/operator of the event monitors (e.g., shown as monitors 101, 102) or even the communication network 110 might be considered as the consumer of the present invention.

Exemplary Hardware Implementation

FIG. 9 illustrates a typical hardware configuration of an information handling/computer system 900 in accordance with the invention and which preferably has at least one processor or central processing unit (CPU) 911.

The CPUs 911 are interconnected via a system bus 912 to a random access memory (RAM) 914, read-only memory (ROM) 916, input/output (I/O) adapter 918 (for connecting peripheral devices such as disk units 921 and tape drives 940 to the bus 912), user interface adapter 922 (for connecting a keyboard 924, mouse 926, speaker 928, microphone 932, and/or other user interface device to the bus 912), a communication adapter 934 for connecting an information handling system to a data processing network, the Internet, an Intranet, a personal area network (PAN), etc., and a display adapter 936 for connecting the bus 912 to a display device 938 and/or printer 939 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 911 and hardware above, to perform the method of the invention.

This signal-bearing media may include, for example, a RAM contained within the CPU 911, as represented by the fast-access storage for example. Alternatively, the instructions may be contained in another signal-bearing media, such as a magnetic data storage diskette 1000 (FIG. 10), directly or indirectly accessible by the CPU 911.

Whether contained in the diskette 1000, the computer/CPU 911, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method for monitoring continual range queries against events, said method comprising:
   receiving one or more range queries;
   decomposing, using a processor on a computer receiving said one or more range queries, each said range query into one or more predefined virtual constructs that together cover a range of said range query when said range is placed in an event space used for monitoring events related to said one or more range queries, each said predefined virtual construct comprising a multi-dimensional region in a multi-dimensional event space, said decomposing of a range query includes assigning an identification to each of one or more said predefined virtual constructs that form a set of said predefined virtual constructs that cover said range in said event space, said identification assigned to each predefined virtual construct included in said set of said predefined virtual constructs being calculated using a size of said predefined virtual construct and a location in said multi-dimensional event space of said predefined virtual construct when covering at least a portion of the range being defined in said range query;
   building a query index, said query index building comprising storing an identification of said query with identification lists associated with said virtual constructs;
   receiving, via an input port of said computer, data associated with one or more events; and
   using said query index to appropriately match an event with said range queries.

2. The method of claim 1, said matching of an event with said range queries further comprising:
   finding all the virtual constructs that cover said event.

3. The method of claim 1, said decomposing of a range query further comprising:
   initializing a working rectangle to be said range query;
   repeatedly cutting a strip rectangle from said working rectangle; and
   decomposing said strip rectangle with one or more of said virtual constructs.

4. The method of claim 2, said finding of all covering virtual constructs of an event comprising:
   pre-computing of a difference table;
   computing an identification of a pivot virtual construct; and
   adding said identification of pivot virtual construct to each of the elements stored in said difference table.

5. A method of providing a service of monitoring events or conditions, said method comprising:
   providing a service that monitors events against interests of a customer, said service monitoring said events by decomposing continual range queries related to said customer interests with one or predefined virtual constructs, building a query index, and using said query index to match an event with said range queries, wherein said decomposing of a continual range query comprises calculating an identification number for each of a predefined virtual construct that at least partially covers a range defined by said continual range query when placed in an overall monitoring region, said identification number being calculated by a number representing a size of said predefined virtual construct and a location of said predefined virtual construct in said overall monitoring region, said calculated identification number being added to said query index;
   maintaining one or more customer interests expressed as continual range queries for the service that monitors events; and
   notifying a subset of said customers whose interests match an event.

6. A system for monitoring continual range queries against events, said system comprising a processor on a computer, as executing:
   a decomposing module that decomposes each range query into one or more predefined virtual constructs, said decomposing module assigning an identification number to each said predefined virtual construct used to cover at least a portion of a range defined by a continual range query with a number calculated as representing a size of said predefined virtual construct and a location of said predefined virtual construct in an overall monitoring region used for monitoring events for said continual range queries;
   a query index construction module, said query index construction module constructing an index of said predefined virtual construct identification numbers; and an event matching module that uses said query index to match an event with said range queries.

7. The system of claim 6, further comprising:
at least one sensor to detect occurrence of events.

8. The system of claim 6, further comprising:
at least one client input station to permit a client to provide an input query.

9. The system of claim 6, further comprising:
at least one client receiver to permit a client to be notified of occurrence of an event of interest.

10. An apparatus for monitoring continual range queries against events, said apparatus comprising:
a query monitor, as executed by a processor on said apparatus, that includes:
a decomposing module that decomposes each range query into one or more predefined virtual constructs, said decomposing module assigning a number for each predefined virtual construct that at least partially covers a range defined in a range query when said range query is placed in an overall monitoring region, said number representing a size of said predefined virtual construct and a location of said predefined virtual construct in said overall monitoring region;
a query index construction module that stores a listing of numbers assigned to each said range query, said query index construction module storing a listing of all numbers assigned to each said range query; and
an event matching module that uses said query index to match an event with said range queries;
a sensor to receive input data and detect occurrence of events and to provide said occurrence of events into said query monitor; and
a client transceiver to permit a client to be notified of occurrence of an event of interest to said client.

11. A non-transitory storage medium tangibly embodying a program of machine-readable instructions executable by a digital processing apparatus to perform a method for monitoring continual range queries against events, said method comprising:
decomposing each range query into one or more predefined virtual constructs, said decomposing including assigning a number for each predefined virtual construct that at least partially covers a range defined in a range query when said range is placed in an overall monitoring region, said number representing a size of said predefined virtual construct and a location of said predefined virtual construct in said overall monitoring region; and
building a query index comprising numbers assigned by said decomposing, said query index storing said numbers assigned by said decomposing; and
using said query index to match an event with said range queries.

12. The method of claim 1, wherein said event is monitored by scanning points in said event space and said event space has at least two dimensions, and wherein said predefined virtual constructs comprise rectangular objects that cover regions in said event space.

13. The method of claim 12, wherein dimensional ratios of said predefined virtual constructs are based on powers of 2 relative to a dimension of said event space.

14. The method of claim 1, wherein each said predefined virtual construct is identified during said decomposing as a number based on:
a location of a corner of said virtual construct in said event space when said virtual construct is used to at least partially cover a range of a range query being decomposed; and
at least one dimension of said virtual construct used to at least partially cover the range query range.

15. The method of claim 14, wherein an identification of each said predefined virtual construct is calculated to be an integer, the calculations for said integer being based at least in part on said location and said at least one dimension.

16. The method of claim 1, wherein said decomposing each range to determine said one or more predefined virtual constructs comprises generating a set of working rectangles in an event space that become progressively smaller in size to cover a range query being decomposed.

\* \* \* \* \*